US007518648B2

(12) United States Patent
Tagami et al.

(10) Patent No.: US 7,518,648 B2
(45) Date of Patent: Apr. 14, 2009

(54) HORIZONTAL REGISTER TRANSFER PULSE GENERATION CIRCUIT AND IMAGING APPARATUS

(75) Inventors: Hiroyasu Tagami, Fukuoka (JP); Masahiro Inoue, Fukuoka (JP); Hideki Yamamoto, Fukuoka (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 11/380,544

(22) Filed: Apr. 27, 2006

(65) Prior Publication Data

US 2006/0244856 A1 Nov. 2, 2006

(30) Foreign Application Priority Data

Apr. 28, 2005 (JP) ............................ P2005-132130

(51) Int. Cl.
*H04N 3/14* (2006.01)
*H04N 5/067* (2006.01)
(52) U.S. Cl. ...................................... 348/312; 348/522
(58) Field of Classification Search ................ 348/294, 348/296, 311, 312, 512, 516, 521, 522
See application file for complete search history.

(56) References Cited

U.S. PATENT DOCUMENTS

| 4,532,547 | A | * | 7/1985 | Bennett | 348/518 |
| 4,736,243 | A | * | 4/1988 | Takanashi et al. | 348/288 |
| 5,483,290 | A | * | 1/1996 | Ohtsubo et al. | 348/516 |
| 5,686,968 | A | * | 11/1997 | Ujiie et al. | 348/521 |
| 5,963,267 | A | * | 10/1999 | Kranawetter | 348/537 |
| 6,014,177 | A | * | 1/2000 | Nozawa | 348/540 |
| 6,795,124 | B1 | * | 9/2004 | Gamo et al. | 348/525 |
| 7,336,310 | B2 | * | 2/2008 | Sakakibara | 348/302 |
| 2004/0073086 | A1 | * | 4/2004 | Abe | 600/109 |

* cited by examiner

*Primary Examiner*—Timothy J Henn
(74) *Attorney, Agent, or Firm*—Sonnenschein Nath & Rosenthal LLP

(57) ABSTRACT

A horizontal register transfer pulse generator includes: phase adjuster generating an output signal, from reference signal; and horizontal blanking period generator based on output signal, reference signal, and horizontal blanking pulse, wherein horizontal blanking period generator includes: delay masking pulse generator generating delay masking pulse delayed by predetermined phase relative to masking pulse generated on horizontal blanking pulse inputted into horizontal blanking period generator; and determination means determining phase difference between output signal and reference signal, when phase difference between output signal and reference signal is less than predetermined phase, horizontal blanking period generator combines masking pulse with output signal to generate horizontal register transfer pulse with horizontal blanking period, and when phase difference between output signal and reference signal is equal to or greater than predetermined phase, horizontal blanking period generator combines delay masking pulse with output signal to generate horizontal register transfer pulse with horizontal blanking period.

3 Claims, 7 Drawing Sheets

PRIOR ART

F I G . 4

PRIOR ART

HORIZONTAL REGISTER TRANSFER PULSE GENERATION CIRCUIT AND IMAGING APPARATUS

CROSS REFERENCE TO RELATED APPLICATIONS

The present application claims priority to Japanese Patent Application JP2005-132130 filed in the Japanese Patent Office on Apr. 28, 2005, the entire contents of which being incorporated herein by reference to the extent permitted by law.

BACKGROUND OF THE INVENTION

1. Field of the Invention

The present invention relates to a horizontal register transfer pulse generation circuit and an imaging apparatus, in particular relates to a horizontal register transfer pulse generation circuit which generates a horizontal register transfer pulse used for driving a horizontal register of a CCD (Charge Coupled Device) type solid state imaging device, and an imaging apparatus having a CCD solid state imaging device which has such a circuit.

2. Description of the Related Art

Conventionally, an imaging apparatus having a CCD type solid state imaging device transfers electric charges accumulated in each photo diode to each vertical register in a light acceptance unit of a CCD type solid state imaging device. The electric charge transferred to this vertical register is transferred to the horizontal register, and the electric charge transferred to this horizontal register is transferred and outputted to an output circuit.

Here, in a case where the electric charge is transferred by the horizontal register, electric charge data for one horizontal line are taken by driving the horizontal register in a situation where operation of a vertical register is stopped. After transferring the electric charge for this one horizontal line, drive of the horizontal register is stopped and the vertical register is driven, whereby the electric charge data for one horizontal line are transferred to the horizontal register from the vertical register.

Line transfer of the electric charge data for one horizontal line from the vertical register to the horizontal register and transfer of the electric charge data for one horizontal line by means of the horizontal register are repeated for one frame, whereby the electric charge data for one frame is taken to obtain image data.

In a case where the horizontal blanking period is provided for a horizontal register transfer pulse, the horizontal register transfer pulse is masked by a signal showing the horizontal blanking period, to thereby generate a horizontal register transfer pulse provided with the horizontal blanking period.

Hereafter, a conventional horizontal register transfer pulse generation circuit which generates the horizontal register transfer pulse will be described.

Figure 4:
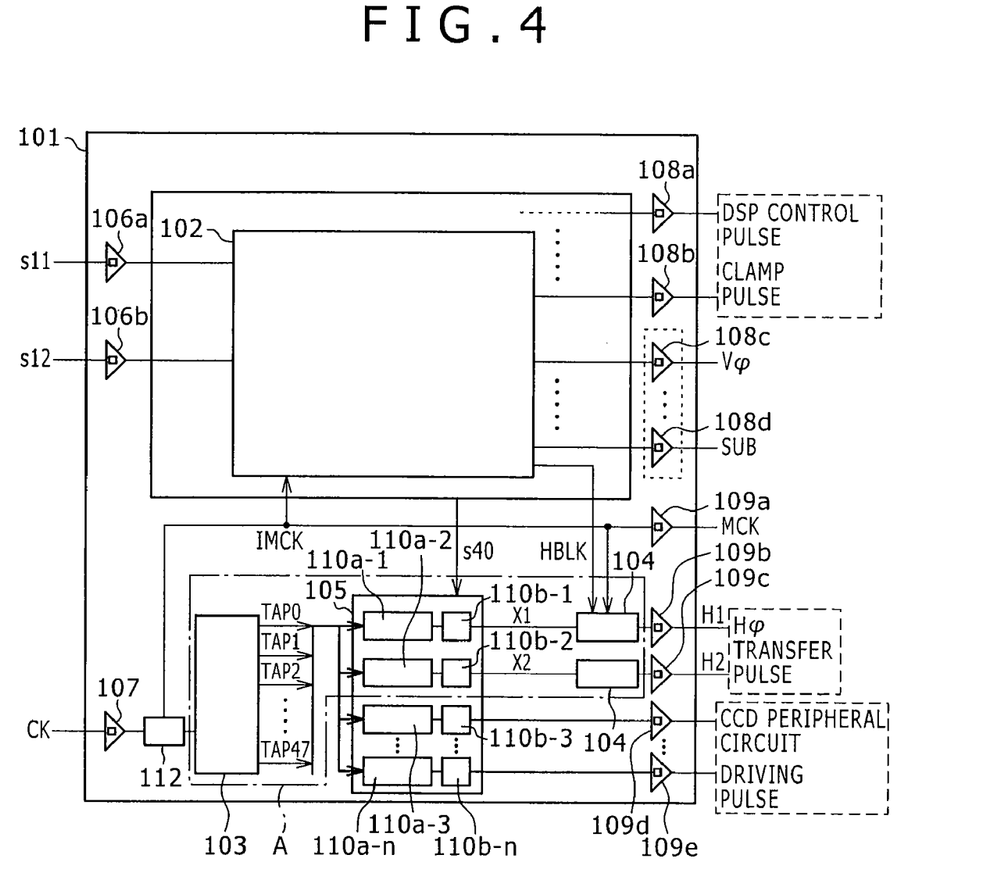
FIG. 4 is a schematic block diagram for explaining a conventional horizontal register transfer pulse generation circuit.

FIG. 4 is a schematic block diagram for explaining the conventional horizontal register transfer pulse generation circuit. A horizontal register transfer pulse generation circuit as indicated by reference sign A in FIG. 4 is provided in a timing generator circuit 101 built in an imaging apparatus which has a CCD type solid state imaging device. In addition, references 106a, 106b, and 107 in FIG. 4 are input buffers, respectively, and references 108a, 108b, 108c, 108d, 109a, 109b, 109c, 109d, and 109e are output buffers, respectively.

In this timing generator circuit, a synchronizing signal s11 in synchronism with other circuits (not shown) and a control signal s12 are arranged to be inputted respectively through input buffers 106a and 106b. The inputted synchronizing signal and the control signal are arranged to be processed in a signal input/output control unit 102 which is constituted by a logic circuit.

The signal input/output control unit is arranged such that a predetermined process is carried out based on the inputted synchronizing signal and control signal and an internal main clock signal to be described later, a predetermined signal is generated which is used for a vertical register transfer pulse V$\phi$, a shutter pulse, etc., and which can be outputted through an output buffer. Further, based on the synchronizing signal, the control signal, and an internal main clock signal IMCK, a phase adjustment control signal s40 inputted into a phase adjustment circuit 105 as will be explained later is generated and outputted, and a horizontal blanking pulse HBLK inputted into a horizontal blanking period synthesis circuit 104 is generated and outputted.

The horizontal register transfer pulse generation circuit is constituted by a frequency divider 112 for dividing a reference clock signal CK which is inputted through an input buffer 107, a delay locked loop circuit (hereinafter referred to as "DLL circuit") 103 which is a delay locked loop means for generating a plurality of TAP output signals based on the clock signal generated by this frequency divider, a phase adjustment circuit 105 for selecting the TAP output signals, the number of which corresponds to a drive system of the horizontal register, from the plurality of TAP output signals generated in this DLL circuit, and adjusting phases of the selected TAP output signals, and the horizontal blanking period synthesis circuit 104 which is a horizontal blanking period synthesis means for combining the TAP output signals X1 and X2 whose phases are adjusted in the phase adjustment circuit (hereinafter referred to as adjusted TAP output signal), with the horizontal blanking pulse HBLK generated by the signal input/output control unit to generate horizontal register transfer pulses H1 and H2.

In addition, the explanation is carried out herein assuming the case where the horizontal register transfer pulse is generated for driving a 2-phase drive horizontal register. However, in a case where the horizontal register transfer pulse is generated for driving a 3-phase drive horizontal register, the horizontal blanking pulse HBLK is combined with the adjusted TAP output signals X1, X2, and X3 to synthesize the horizontal register transfer pulses H1, H2, and H3. The same applies to a horizontal register driven by way of four or more phases.

Figure 5:
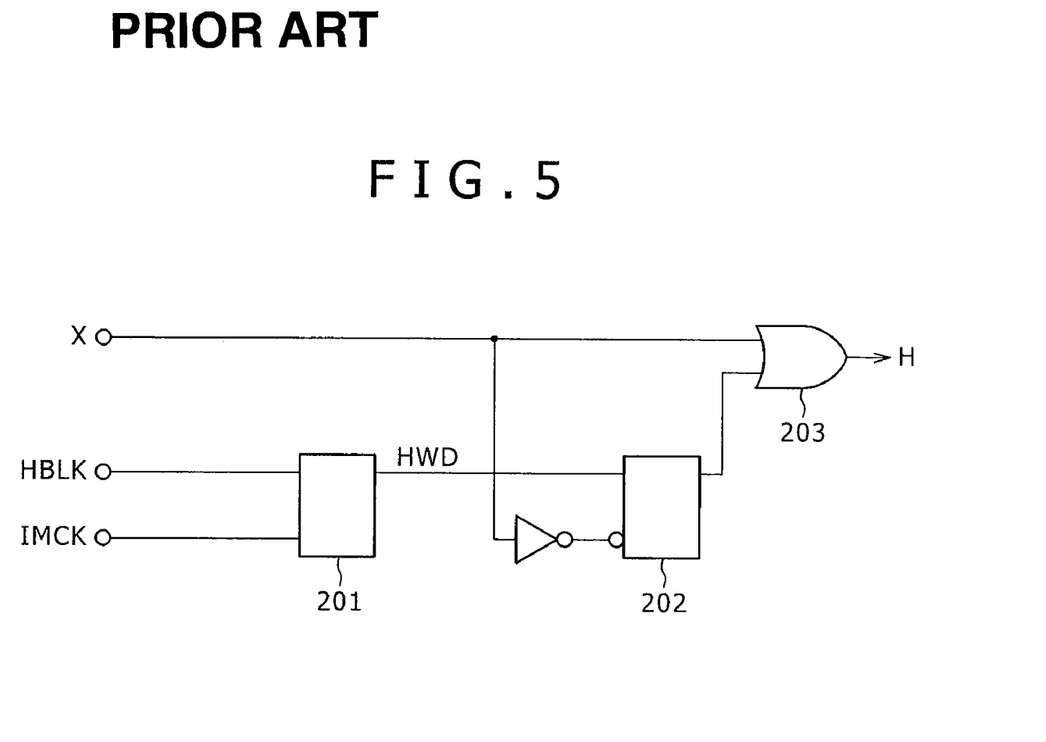
FIG. 5 is a schematic block diagram for explaining a horizontal blanking period synthesis circuit.

As shown in FIG. 5, in the horizontal blanking period synthesis circuit a flip-flop circuit 201 synchronizes the horizontal blanking pulse HBLK with the internal main clock signal IMCK to generate a synchronous horizontal blanking pulse HWD (hereinafter, only referred to as HWD) that is a masking pulse. The horizontal blanking period synthesis circuit is constituted by a latch circuit 202 having a data terminal through which HWD is inputted and a gate terminal through which a signal obtained by reversing the adjusted TAP output signal X is inputted, and a logical add circuit 203 for generating a horizontal register transfer pulse H based on the output signal of this latch circuit and the adjusted TAP output signal X.

In addition, the number of the TAP output signals selected in the phase adjustment circuit is a number according to the drive system of the horizontal register. It is arranged that in a case where the horizontal register is 2-phase driven, two TAP output signals are selected, in a case where the horizontal register is 3-phase driven, three TAP output signals are selected, and in a case where the horizontal register is 4-phase driven, four TAP output signals are selected.

Further, the phase adjustment circuit is generally constituted by delay adjustment circuits 110a-1, 110a-2, ..., 110a-n formed of a delay element, and duty ratio adjustment circuits 110b-1, 110b-2, ..., 110b-n in which either or both a rising edge and a falling edge of an inputted pulse is delayed to adjust a duty ratio, and arranged such that a horizontal register transfer pulse may be generated based on the phase adjustment control signal inputted from the signal input/output control unit (see Japanese Patent Application Publication No. 2003-23344, for example).

Figure 6A:
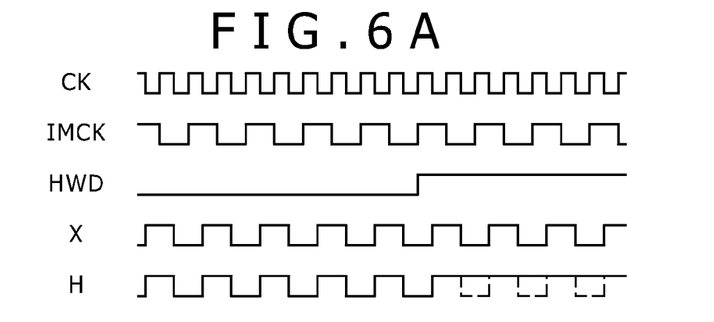
FIG. 6A to 6D are timing charts (1) for explaining generation of the horizontal register transfer pulse.

As described above, by combining HWD with the adjusted TAP output signal X, the horizontal register transfer pulse H which maintains H level without the pulse falling can be generated during a period when HWD is at a high level (hereinafter referred to as H level), as shown in FIG. 6A. In addition, although FIG. 6A illustrates an example where the horizontal register transfer pulse does not fall and the H level is maintained during the period when HWD is at the H level, a horizontal register transfer pulse may be generated which does not rise and maintains a low level (hereinafter referred to as L level) during the period when HWD is at the H level.

SUMMARY OF THE INVENTION

Incidentally, when performing phase adjustment by means of such a delay element, as described above, it is difficult to expand a control range, because an amount of delay which can be adjusted is influenced by a circuit scale. Further, it is difficult to maintain phase relationships constant, because of the influence of variations resulting from a manufacture process, a supply voltage, an operating temperature, etc.

In other words, a certain amount of variation arises in the adjusted TAP output signal X. When the timing at which HWD reaches the H level is within a range (which is a range as indicated by reference L in FIG. 6, and hereinafter referred to as "variation range") where the variation arises, the horizontal register transfer pulse is considerably influenced by the variation in the adjusted TAP output signal X. Therefore, there is room for improvement in such points.

Figure 6B:
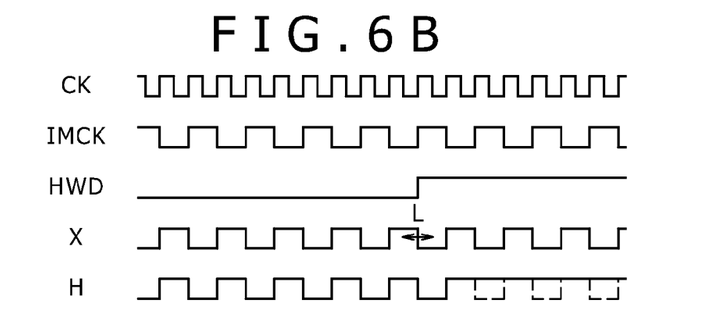
Figure 6C:
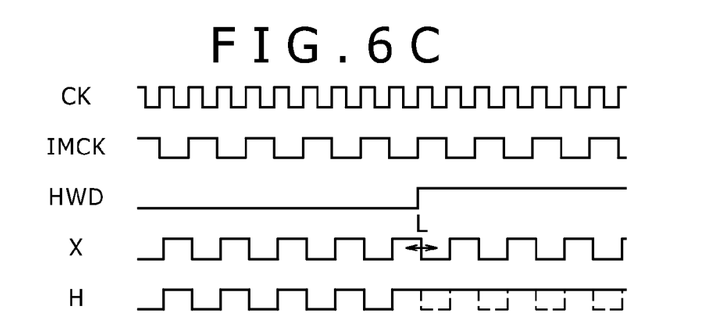
Figure 6D:
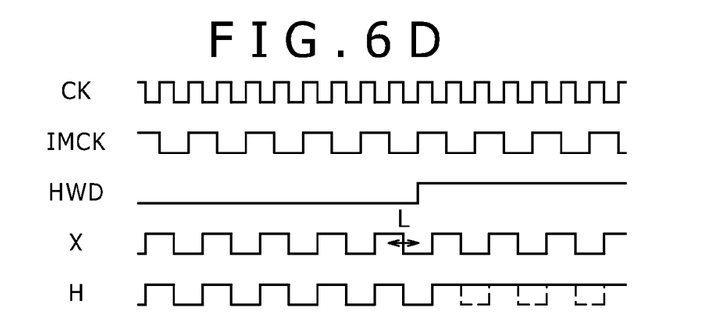

In particular, when HWD rises at the time of the L level after the falling timing of the adjusted TAP output signal X, the timing chart of the horizontal register transfer pulse is as shown in FIG. 6B. On the other hand, when HWD rises at the time of the H level before the falling timing of the adjusted TAP output signal X, the timing chart of a horizontal register transfer pulse is as shown in FIG. 6C. Thus, the variation in rising timing of the adjusted TAP output signal X caused by the variation in the adjusted TAP output signal X may result in different timing charts of the horizontal register transfer pulses H. In addition, such a problem does not arise when HWD does not rise within the variation range, as shown in FIG. 6D.

Figure 7A:
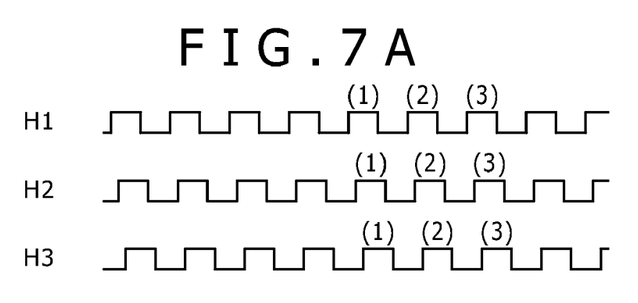
FIG. 7A to 7C are timing charts (2) for explaining generation of the horizontal register transfer pulse.

Further, the generation of the conventional horizontal register transfer pulse may cause poor transfer when the horizontal register employs a drive system of three or more phases. Therefore, there is also room for improvement in such a point Hereafter, poor transfer in a case where the horizontal register adopts the drive system of three or more phases will be described. In addition, when the horizontal register transfers the electric charge by applying the transfer pulses H1, H2, and H3 in the case of 3-phase drive, each transfer pulse has the phase difference by 120° as generally shown in FIG. 7A, whereby the horizontal register performs the electric charge transfer. Further, references (1)-(3) in FIG. 7 are used for the purpose of clarifying correspondence among the transfer pulses H1, H2, and H3.

Figure 7B:
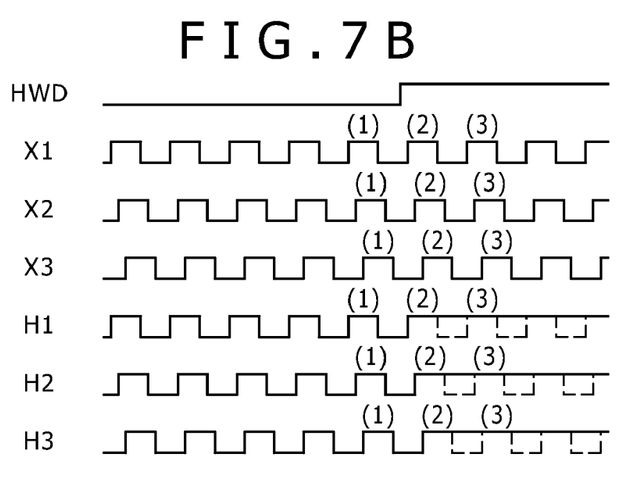

Now, in a case where HWD rises after the adjusted TAP output signal X3 falls, and before the adjusted TAP output signal X1 rises, the timing chart of the horizontal register transfer pulse is as shown in FIG. 7B. In other words, masking starts with the timing as indicated by reference sign (2) with respect to all of the horizontal register transfer pulses H1, H2, and H3.

Figure 7C:
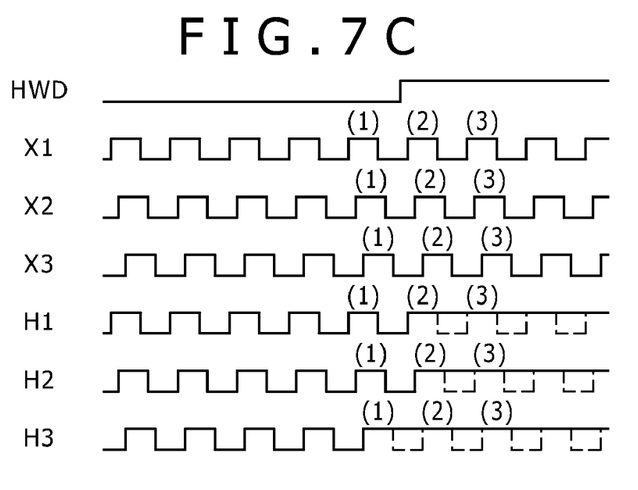

On the other hand, in a case where HWD rises after the adjusted TAP output signal X2 falls and before the adjusted TAP output signal X3 rises, the timing chart of the horizontal register transfer pulse is as shown in FIG. 7C. In other words, with respect to the horizontal register transfer pulses H1 and H2, masking starts with the timing as indicated by reference sign (2), while masking starts with the timing as indicated by (1) with respect to the horizontal register transfer pulse H3. Thus, the different timings, with which masking starts, which depend on the horizontal register transfer pulses may cause poor transfer. In other words, according to the rising position of a masking pulse, a variation arises in the timing with which masking the transfer pulse starts, which may lead to poor transfer.

In addition, in a case where the drive system of three or more phases is adopted, it is possible that poor transfer of the electric charge may arise as described above. However, as for the 2-phase drive, by reversing one horizontal register transfer pulse, the other horizontal register transfer pulse is generated, thus such poor transfer, as described above, may not arise.

In view of the above points, the present invention is conceived and provides a horizontal register transfer pulse generation circuit and an imaging apparatus having such a circuit that generate a horizontal register transfer pulse, that can reduce poor transfer even if arbitrary phase adjustment is carried out, and that may not be easily influenced by variations resulting from phase adjustment even in the case of adopting a drive system of three or more phases.

According to an emobodiment of the present invention, there is provided a horizontal register transfer pulse generation circuit having phase adjustment means for generating an output signal, subjected to predetermined phase adjustment, from a reference signal by means of which a horizontal register transfer pulse is generated, and horizontal blanking period generation means for generating a horizontal register transfer pulse provided with a horizontal blanking period, based on the output signal, the reference signal, and a horizontal blanking pulse, wherein the horizontal blanking period generation means includes a delay masking pulse generation means for generating a delay masking pulse which is delayed by a predetermined phase relative to a masking pulse generated based on the horizontal blanking pulse inputted into the horizontal blanking period generation means, and determination means for determining a phase difference between the output signal and the reference signal; when the phase difference between the output signal and the reference signal is less than the predetermined phase as a result of the determination by the determination means, the horizontal blanking period generation means combines the masking pulse with the output signal to generate a horizontal register transfer pulse provided with a horizontal blanking period; when the phase difference between the output signal and the reference signal is equal to or greater than the predetermined phase, the horizontal blanking period generation means combines the delay masking pulse with the output signal to generate a horizontal register transfer pulse provided with the horizontal blanking period.

According to another embodiment of the present invention, there is provided an imaging apparatus having a horizontal register transfer pulse generation circuit including phase adjustment means for generating an output signal, subjected to predetermined phase adjustment, from a reference signal by means of which a horizontal register transfer pulse is generated, and horizontal blanking period generation means for generating a horizontal register transfer pulse provided with a horizontal blanking period, based on the output signal, the reference signal, and a horizontal blanking pulse, wherein the horizontal blanking period generation means includes a delay masking pulse generation means for generating a delay masking pulse which is delayed by a predetermined phase relative to a masking pulse generated based on the horizontal blanking pulse inputted into the horizontal blanking period generation means, and determination means for determining a phase difference between the output signal and the reference signal; when the phase difference between the output signal and the reference signal is less than the predetermined phase as a result of the determination by the determination means, the horizontal blanking period generation means combines the masking pulse with the output signal to generate a horizontal register transfer pulse provided with a horizontal blanking period; when the phase difference between the output signal and the reference signal is equal to or greater than the predetermined phase, the horizontal blanking period generation means combines the delay masking pulse with the output signal to generate a horizontal register transfer pulse provided with the horizontal blanking period.

Here, as a result of the determination by the determination means, when the phase difference between the output signal and the reference signal is less than the predetermined phase, the masking pulse is combined with the output signal to generate the horizontal register transfer pulse provided with the horizontal blanking period. When the phase difference between the output signal and the reference signal is equal to or greater than the predetermined phase, the influence of the variation in the output signal can be reduced by combining the delay masking pulse with the output signal to generate the horizontal register transfer pulse provided with the horizontal blanking period, in other words, by choosing an appropriate masking pulse to be combined with the output signal according to the variation, in the output signal, caused by the variations resulting from a manufacture process, a supply voltage, an operating temperature, etc.

Further, when adopting the drive system of three or more phases, masking start timing can be changed according to each horizontal register transfer pulse.

Furthermore, in the case of the 2-phase drive system, provision of a plurality of masking pulses contributes to elimination of uncertain pulses as shown in FIG. 6

As described above, in the horizontal register transfer pulse generation circuit of the present invention, even if arbitrary phase adjustment is carried out, the horizontal register transfer pulse can be generated which cannot be easily influenced by the variations in the phase-adjusted output signal resulting from the phase adjustment. Further, when adopting the drive system of three or more phases, the mask start timing can be changed according to each horizontal register transfer pulse, so that poor transfer can be reduced.

Further features of the invention, and the advantages offered thereby, are explained in detail hereinafter, in reference to specific embodiments of the invention illustrated in the accompanying drawings.

DESCRIPTION OF THE PREFERRED EMBODIMENTS

Figure 1:
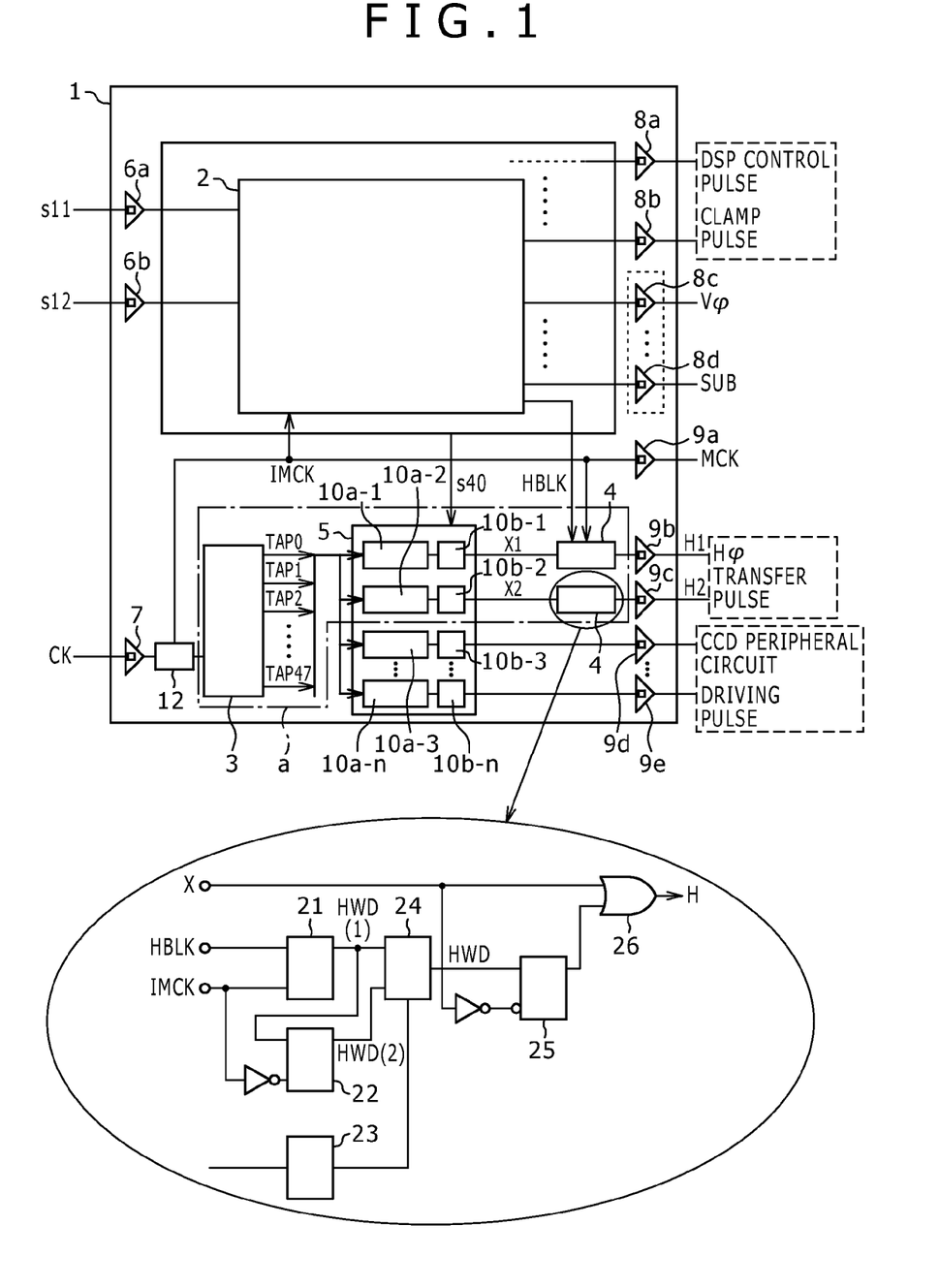
FIG. 1 is a schematic block diagram for explaining a horizontal register transfer pulse generation circuit to which the present invention is applied.

FIG. 1 is a schematic block diagram for explaining a horizontal register transfer pulse generation circuit to which the present invention is applied. A horizontal register transfer pulse generation circuit as indicated by reference "a" in FIG. 1 is provided in a timing generator circuit 1 built in an imaging apparatus which has a CCD solid state imaging device.

In addition, references 6a, 6b, and 7 in FIG. 1 respectively indicate input buffers, and references 8a, 8b, 8c, 8d, 9a, 9b, 9c, 9d, and 9e are output buffers, respectively.

In this timing generator circuit, as with the conventional timing generator, the synchronizing signal s11 in synchronism with other circuits (not shown) and the control signal s12 are arranged to be inputted through the input buffers 6a and 6b respectively. The inputted synchronizing signal and the control signal are arranged to be processed in a signal input/output control unit 2 which is constituted by a logic circuit.

As with the conventional timing generator, the signal input/output unit is arranged such that a predetermined process is carried out based on the thus inputted synchronizing signal and control signal and an internal main clock signal to be described later, a predetermined signal is generated which is used for a vertical register transfer pulse Vϕ, a shutter pulse, etc., and which can be outputted through an output buffer. Further, based on the synchronizing signal, the control signal, and an internal main clock signal IMCK, a phase adjustment control signal s40 inputted into a phase adjustment circuit 5 as will be described later is generated and outputted, and a horizontal blanking pulse HBLK inputted into a horizontal blanking period synthesis circuit 4 is generated and outputted.

As with the conventional timing generator, the horizontal register transfer pulse generation circuit is constituted by a frequency divider 12 for dividing a reference clock signal CK which is inputted through an input buffer 7, a DLL circuit 3 for generating a plurality of TAP output signals based on the clock signal generated by this frequency divider, a phase adjustment circuit 5 for selecting the TAP output signals, the number of which corresponds to a drive system of the horizontal register, from the plurality of TAP output signals generated in this DLL circuit, and adjusting phases of the selected TAP output signals, and a horizontal blanking period synthesis circuit 4 which is a horizontal blanking period synthesis means for combining the adjusted TAP output signals X whose phases are adjusted in the phase adjustment circuit, with the horizontal blanking pulse HBLK generated by the signal input/output control unit to synthesize the horizontal register transfer pulses.

In addition, the explanation is carried out herein assuming the case where the horizontal register transfer pulse is generated for driving a 2-phase drive horizontal register. However, in a case where the horizontal register transfer pulse is generated for driving a 3-phase drive horizontal register, the horizontal blanking pulse HBLK is combined with the adjusted TAP output signals X1, X2, and X3 to synthesize the horizontal register transfer pulses H1, H2, and H3. The same applies to a horizontal register driven by way of four or more phases.

In the horizontal blanking period synthesis circuit, a first flip-flop circuit 21 synchronizes the horizontal blanking pulse HBLK with the internal main clock signal IMCK to generate a synchronous horizontal blanking pulse HWD(1) (hereinafter, only referred to as HWD(1)) which is a masking pulse, and a second flip-flop circuit 22 synchronizes HWD(1) with an inversion signal of the internal main clock signal IMCK to generate a delay masking pulse HWD(2) (hereafter only referred to as HWD(2)) which is delayed by a predetermined period relative to HWD(1). The horizontal blanking period synthesis circuit is constituted by a selector 24 for receiving HWD(1) and HWD(2) and outputting either HWD(1) or HWD(2) as an output signal HWD based on determination by means of a determination unit 23, a latch circuit 25 having a data terminal through which the output signal is inputted from the selector and a gate terminal through which a signal obtained by reversing the adjusted TAP output signal X is inputted, and a logical add circuit 26 for generating a horizontal register transfer pulse based on the output signal from this latch circuit and the adjusted TAP output signal X.

In addition, similar to the conventional timing generator, the number of the TAP output signals selected in the phase adjustment circuit is a number according to the drive system of the horizontal register, the phase adjustment circuit is constituted by delay adjustment circuits 10a-1, 10a-2, ..., 10 a-n having a delay element and duty ratio adjustment circuits 10b-1, 10b-2, ..., 10 b-n for respectively delaying a rising edge or a falling edge of a pulse inputted, and the horizontal register transfer pulse is generated based on the phase adjustment control signal inputted from the signal input/output control unit.

Hereafter, there is described [A] the case where the horizontal register transfer pulse for the 2-phase drive horizontal register is generated by means of the timing generator circuit, and [B] the case where the horizontal register transfer pulse for the 3-phase drive horizontal register is generated by means of the timing generator circuit.

[A] The case where the horizontal register transfer pulse for the 2-phase drive horizontal register is generated (see FIG. 2).

In a case where the horizontal register transfer pulse H1 for the 2-phase drive horizontal register which transmits electric charges is generated by applying the horizontal register transfer pulses H1 and H2 each having a phase difference of 180°, when the timing at which HWD(1) reaches the H level is within the variation range of the adjusted TAP output signal X1, the delay of HWD(2) relative to HWD(1) is adjusted so that the timing at which HWD(2) reaches H level may be outside the variation range of the adjusted TAP output signal X1.

Next, the phase difference between the adjusted TAP output signal X1 and the reference signal is determined by means of the determination unit in the horizontal blanking period synthesis circuit. When the timing at which HWD(1) reaches the H level is within the variation range of the adjusted TAP output signal X1, HWD(2) is outputted as the output signal HWD by the selector. On the other hand, when the timing at which HWD(1) reaches the H level is outside the variation range of the adjusted TAP output signal X1, HWD(1) is outputted as the output signal HWD by the selector.

HWD obtained in this way and a signal obtained by reversing the adjusted TAP output signal X1 are inputted into the latch circuit. Based on the output signal of this latch circuit and the adjusted TAP output signal X1, it is possible to obtain the horizontal register driving pulse H1 for the 2-phase drive horizontal register. In addition, the horizontal register driving pulse H2 can be obtained by reversing H1.

Figure 2A:
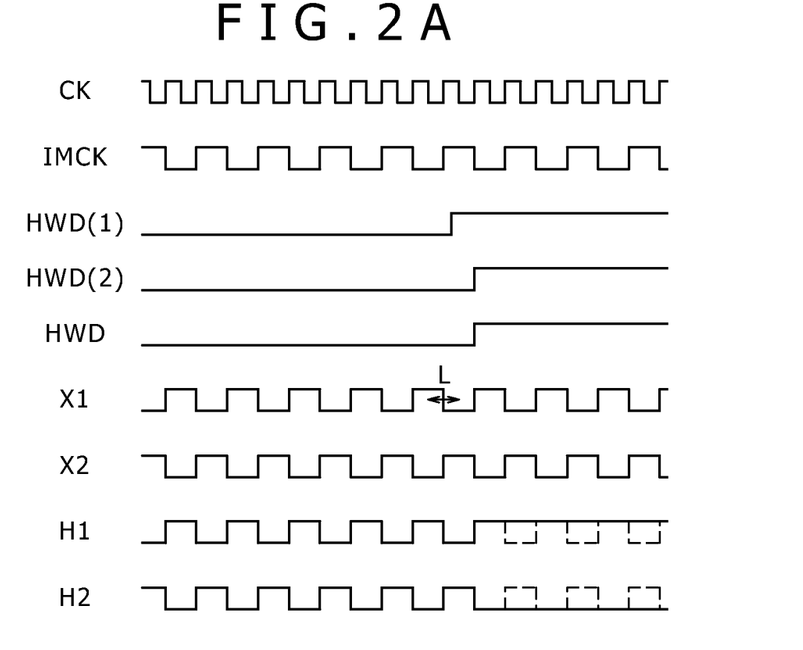
FIG. 2A to 2B are timing charts for explaining generation of a horizontal register transfer pulse for a 2-phase drive horizontal register.
Figure 2B:
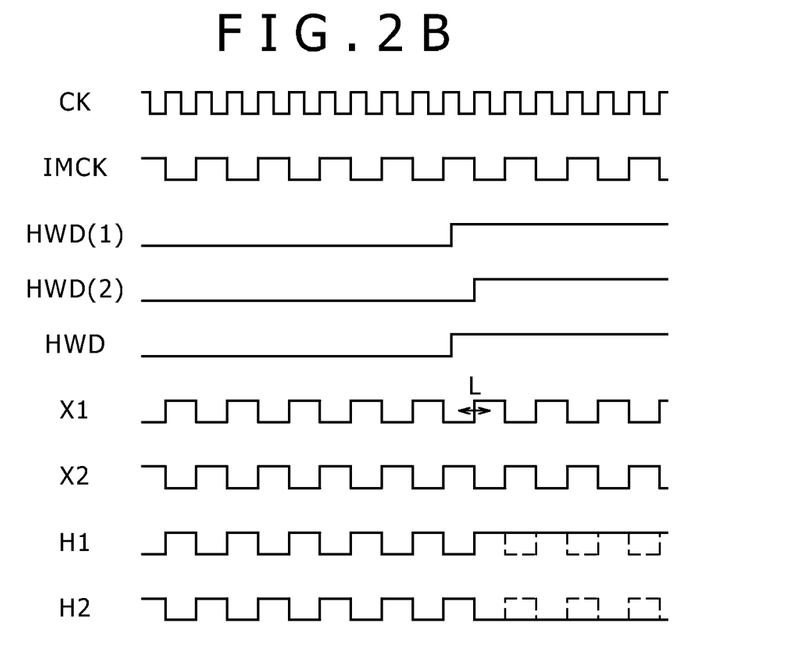

As described above, when the timing at which HWD(1) reaches the H level is within the variation range of the adjusted TAP output signal X1 (in the case of the timing as shown in FIG. 2A), HWD(2) is selected as HWD, and the horizontal register driving pulses H1 and H2 are generated based on HWD(2) and the adjusted TAP output signal X1. When the timing at which HWD(2) reaches the H level is outside the variation range of the adjusted TAP output signal X1 (in the case of the timing as shown in FIG. 2B), HWD(1) is selected as HWD, and the horizontal register driving pulse signals H1 and H2 are generated based on HWD and the adjusted TAP output signal X1. Thus, the timing at which HWD reaches the H level is outside the variation range of the adjusted TAP output signal X1, therefore, the horizontal register driving pulses H1 and H2 are not influenced with the variation in the adjusted TAP output.

Figure 3:
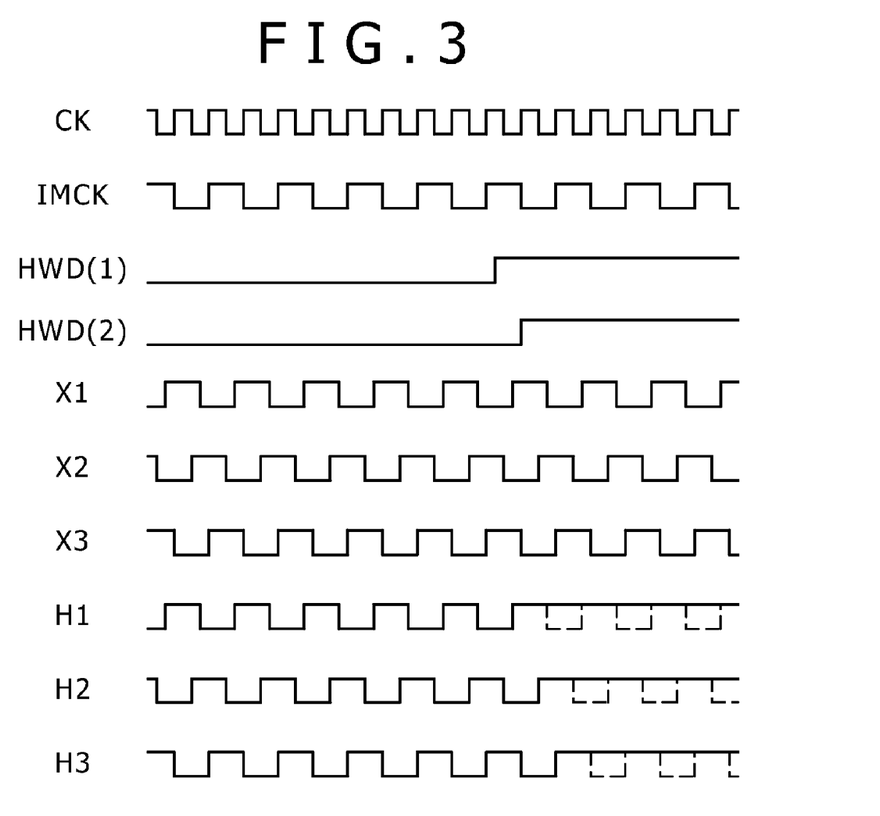
FIG. 3 is a timing chart for explaining generation of a horizontal register transfer pulse for a 3-phase drive horizontal register.

[B] The case where the horizontal register transfer pulse for the 3-phase drive horizontal register is generated (see FIG. 3)

In a case where the horizontal register transfer pulses H1, H2, and H3 for the 3-phase drive horizontal register which transmits electric charges are generated by applying the horizontal register transfer pulses H1, H2, and H3 each having a phase difference of 120°, HWD(2) is delayed by 180° relative to HWD(1) so that HWD(1) and HWD(2) have a phase difference of 180°.

Next, the phase difference between each of the adjusted TAP output signals X (X1, X2, and X3) and the reference signal is determined by means of the determination unit in the horizontal blanking period synthesis circuit. When the phase difference from the reference signal is less than 180° (in the case of X1 and X2 as for the timings shown in FIG. 3), HWD(1) is outputted as the output signal HWD by the selector. On the other hand, when the phase difference from the reference signal is equal to or greater than 180° (in the case of X3 as for the timing shown in FIG. 3), HWD(2) is outputted as the output signal HWD by the selector.

HWD obtained in this way and signals obtained by reversing the adjusted TAP output signals X (X1, X2, X3) are inputted into the latch circuit. Based on the output signal of this latch circuit and the adjusted TAP output signals X (X1, X2, X3), it is possible to obtain the horizontal register driving pulses H1, H2, and H3 for the 3-phase drive horizontal register.

As described above, the phase difference of 180° is provided between HWD(1) and HWD(2). In the case of the adjusted TAP output signal having the phase difference, of less than 180°, from the reference signal, HWD(1) is selected as HWD. In the case of the adjusted TAP output signal having the phase difference, of 180° or more, from the reference signal, HWD(2) is selected as HWD. Based on HWD and the adjusted TAP output signal, the horizontal register driving pulse signals H1, H2, and H3 are generated, so that the masking can be started with the timing according to the phase difference in the horizontal register driving pulse, and poor transfer can be inhibited.

It should be understood by those skilled in the art that various modifications, combinations, sub-combinations and alterations may occur depending on design requirements and other factors insofar as they are within the scope of the appended claims or the equivalents thereof.

What is claimed is:

1. A horizontal register transfer pulse generation circuit comprising:
   phase adjustment means for generating an output signal, subjected to predetermined phase adjustment, from a reference signal by means of which a horizontal register transfer pulse is generated; and
   horizontal blanking period generation means for generating a horizontal register transfer pulse provided with a horizontal blanking period, based on said output signal, said reference signal, and a horizontal blanking pulse,
   wherein said horizontal blanking period generation means includes: a delay masking pulse generation means for generating a delay masking pulse which is delayed by a predetermined phase relative to a masking pulse generated based on the horizontal blanking pulse inputted into said horizontal blanking period generation means; and determination means for determining a phase difference between said output signal and said reference signal,
   when the phase difference between said output signal and said reference signal is less than the predetermined phase as a result of the determination by said determination means, said horizontal blanking period generation means combines said masking pulse with said output signal to generate a horizontal register transfer pulse provided with a horizontal blanking period, and
   when the phase difference between said output signal and said reference signal is equal to or greater than the predetermined phase, said horizontal blanking period generation means combines said delay masking pulse with said output signal to generate a horizontal register transfer pulse provided with the horizontal blanking period.

2. A horizontal register transfer pulse generation circuit according to claim 1, wherein said horizontal blanking period generation means comprises:
   a latch circuit having a gate terminal for inputting said masking pulse or said delay masking pulse, and a data terminal for inputting a signal obtained by reversing said output signal; and
   a logical add circuit for generating a horizontal register transfer pulse based on said output signal and an output signal from said latch circuit,
   when the phase difference between said output signal and said reference signal is less than the predetermined phase as a result of the determination by said determination means, said masking pulse is inputted into said latch circuit, and
   when the phase difference between said output signal and said reference signal is equal to or greater than the predetermined phase, said delay masking pulse is inputted into said latch circuit.

3. An imaging apparatus having a horizontal register transfer pulse generation circuit, said circuit comprising:
   phase adjustment means for generating an output signal, subjected to predetermined phase adjustment, from a reference signal by means of which a horizontal register transfer pulse is generated; and
   horizontal blanking period generation means for generating a horizontal register transfer pulse provided with a horizontal blanking period, based on said output signal, said reference signal, and a horizontal blanking pulse,
   wherein said horizontal blanking period generation means includes: a delay masking pulse generation means for generating a delay masking pulse which is delayed by a predetermined phase relative to a masking pulse generated based on the horizontal blanking pulse inputted into said horizontal blanking period generation means; and determination means for determining a phase difference between said output signal and said reference signal,
   when the phase difference between said output signal and said reference signal is less than the predetermined phase as a result of the determination by said determination means, said horizontal blanking period generation means combines said masking pulse with said output signal to generate a horizontal register transfer pulse provided with a horizontal blanking period, and
   when the phase difference between said output signal and said reference signal is equal to or greater than the predetermined phase, said horizontal blanking period generation means combines said delay masking pulse with said output signal to generate a horizontal register transfer pulse provided with the horizontal blanking period.

* * * * *